Patented Jan. 28, 1947

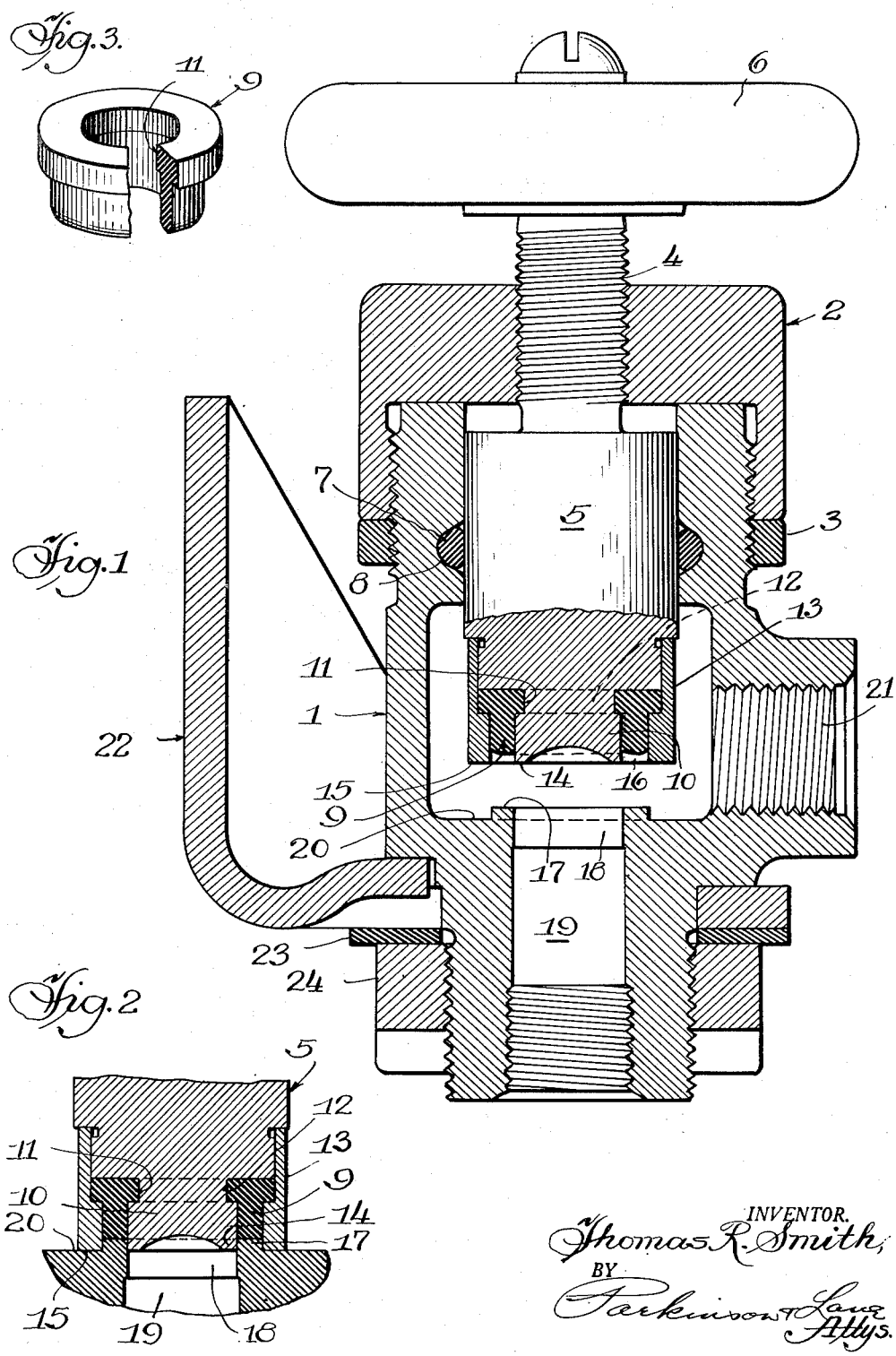

2,414,908

UNITED STATES PATENT OFFICE 2,414,908

VALVE SEAT SEAL FOR HIGH PRESSURES

Thomas R. Smith, Newton, Iowa, assignor to The Maytag Company, Newton, Iowa, a corporation of Delaware Application July 17, 1944, Serial No. 545,289

3 Claims. (Cl. 251—27)

The present invention relates to valve assemblies and especially to a novel construction and arrangement of a valve seat seal which allows the valve to hold and seal high pressures in either direction.

Among the objects of the present invention is to provide a novel valve construction having a valve seat seal which is equally effective in sealing fluids under high pressures in either direction.

Another object is to provide a novel seal assembly including a resilient valve seat seal adapted to be moved into sealing contact with a valve seat in such manner as to be self-sealing under pressure and the amount of squeeze placed thereon is limited by a metal-to-metal contact preventing any extrusion of the material of the seal. In the novel illustrative embodiment shown in the drawing, this is accomplished by confining the seal or sealing member in a cavity before it actually makes contact with the valve seat to effect the final sealing.

A further object of the present invention is to provide a valve construction which gives optimum sealing regardless of whether the fluid under high pressure flows through the valve seat in either direction. By confining the seal in the novel manner disclosed and contemplated, there is no possibility of the seal being extruded under any conditions of operation and regardless of the pressure of the fluid being transmitted.

Further objects are to provide a construction of maximum simplicity, efficiency, economy and ease of assembly and operation, and such further objects, advantages and capabilities as will later more fully appear and are inherently possessed thereby.

The invention resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a view part in vertical cross section and part in side elevation of a valve construction embodying the present invention, the valve being shown in open position.

Figure 2 is a fragmentary view in vertical cross section showing the end of the plunger and sealing ring in closed or sealing relation.

Figure 3 is a fragmentary perspective view of the resilient sealing member.

Referring more particularly to the disclosure in the drawing, the novel illustrative embodiment therein shown comprises a valve body 1 having its upper end threaded for the reception of a cap 2 and a lock nut 3. Threaded into the cap 2 is a stem 4 of a plunger 5 adapted to be raised or lowered within the valve body by means of a hand wheel 6. The plunger is sealed from leakage by means of a sealing ring 7 mounted within a groove or recess 8 in the inner surface of the valve body and having sealing contact with the outer circumference of the plunger.

The plunger 5 is reduced at its lower end to receive a seal or sealing member 9 which is shown as substantially T-shaped in cross section and of a resilient, rubber-like material such as natural or compounded synthetic rubber having sufficient elasticity such that it may be stretched and snapped over the reduced end 10 of the plunger with its inner flange 11 seating within the annular groove or recess 12 and held therein by means of a press ring 13. The lower end 14 of the plunger and the lower end 15 of the press ring extend beyond the lower end of the seal to thereby form an annular cavity 16.

The valve body is machined in such manner as to provide a valve seat having a raised annular portion or rib 17 which when the plunger is lowered, is received in the annular cavity 16 of the valve plunger assembly. In other words, as the valve plunger is screwed down by the operation of the hand wheel 6, the raised annular valve seat portion 17 enters the annular cavity 16 confining the end of the valve seat seal 9 and thereby preventing the latter from extruding under pressure. Thus by holding the clearance between the annular raised portion 17 of the valve seat and the annular cavity or space 16 in the plunger to a minimum, it will be appreciated that there is no place for the resilient material of the seal to extrude.

The dimensions and arrangement of the lower end 14 of the plunger and the upper end 18 of the passage 19 is such that this lower end enters into the space 18 while the end 15 of the press ring 13 is adapted to encompass the annular raised portion or rib 17 of the valve seat in such manner that the raised portion or rib is contacted by the end of the valve seat seal 9 slightly ahead of the contact of the end 15 of the press ring with the base 20 of the valve seat, the latter forming a stop against further movement of the plunger assembly. This permits an initial compression between the annular raised portion or rib 17 of the valve seat and the valve seat seal 9.

The contact between the end of the press ring and the base 20 of the valve seat provides a stop or abutment which limits the amount of squeeze placed on the valve seat seal 9.

It will be apparent that it is immaterial whether the flow of the fluid under pressure is up through the passage 19 of the valve seat and out through the passage 21, or through the passage 21 and down through the valve seat as the operation and functioning of the sealing is the same in either direction of flow. By confining the valve seat seal in the annular space between the end 14 of the plunger and the press ring and such confinement being maintained before the seal makes contact with the raised portion 17 of the valve seat to effect final sealing, prevents any possibility of extrusion of the material of the sealing member under all conditions of operation and pressures employed.

The valve assembly is shown as provided with a bracket or other mounting 22 and secured thereto by a lockwasher 23 and nut 24. The passages 19 and 21 are each threaded for suitable attachment to either an inlet or an outlet for transmitting fluid under pressure.

Having thus disclosed my invention, I claim:

1. In a valve construction, a valve body having passages for the transmission of fluid under pressure in either direction, a valve seat formed in the body and provided with an annular upstanding portion, a plunger vertically adjustable in the valve body and provided with an annular and downwardly opening recess, the cross sectional area of said recess being substantially equal to the cross sectional area of the upstanding portion, a resilient seal carried in the plunger and having a sealing lip depending in the recess but spaced from the end of the plunger when in the open position a distance less than the height of the upstanding portion so that when the plunger is moved to close the valve, the upstanding portion enters the recess and is contacted by and deforms the sealing lip prior to the plunger engaging the body about the valve seat to place the seal under partial deformation only so that fluid pressure acting on the sealing lip effects a seal.

2. In a sealing construction adapted to prevent a fluid from passing through an opening, a plunger provided with an annular recess facing said opening, a member provided with the opening and having an upstanding portion encompassing the opening and adapted to be conformably received in the recess, a resilient sealing member carried in and conforming with the recess and provided with a sealing lip depending in the recess but spaced from the end of the plunger when in open position a distance less than the height of the upstanding portion so that when the plunger is moved to close the valve, the upstanding portion enters the recess and is contacted by and deforms the sealing lip prior to the plunger engaging the member about the opening to place the seal under partial deformation only so that fluid pressure acting on the sealing lip effects a seal.

3. In a sealing construction adapted to prevent a fluid from passing through an opening, a plunger provided with an annular recess facing said opening, a member provided with the opening and having an upstanding portion encompassing the opening and adapted to be conformably received in the recess, a resilient sealing member carried in and conforming with the recess and provided with a sealing lip depending in the recess, a stop provided for the plunger so that when the plunger is moved to close the valve, the upstanding portion enters the recess and is contacted by and deforms the sealing lip prior to engagement of the stop to place the seal under partial deformation only so that fluid pressure acting on the sealing lip effects a seal.

THOMAS R. SMITH.